(12) United States Patent
Welles, II et al.

(10) Patent No.: US 6,970,097 B2
(45) Date of Patent: Nov. 29, 2005

(54) LOCATION SYSTEM USING RETRANSMISSION OF IDENTIFYING INFORMATION

(75) Inventors: Kenneth Brakeley Welles, II, Scotia, NY (US); John E. Hershey, Ballston Lake, NY (US); Ralph T. Hoctor, Saratoga Springs, NY (US); David M. Davenport, Niskayuna, NY (US)

(73) Assignee: GE Medical Systems Information Technologies, Inc., Milwaukee, WI (US)

( * ) Notice: Subject to any disclaimer, the term of this patent is extended or adjusted under 35 U.S.C. 154(b) by 572 days.

(21) Appl. No.: 09/681,621

(22) Filed: May 10, 2001

(65) Prior Publication Data

US 2002/0167417 A1 Nov. 14, 2002

(51) Int. Cl.⁷ ................................................ G08B 5/22
(52) U.S. Cl. ........................... 340/825.49; 340/870.28; 340/539.13
(58) Field of Search .................. 340/825.49, 10.1, 340/10.4, 539.13, 573.4, 572.1, 568, 538; 600/300

(56) References Cited

U.S. PATENT DOCUMENTS

| | | | | |
|---|---|---|---|---|
| 3,590,271 A | * | 6/1971 | Peters | 307/140 |
| 3,639,907 A | | 2/1972 | Greatbatch | |
| 3,657,715 A | * | 4/1972 | Curtin | 367/197 |
| 3,739,329 A | * | 6/1973 | Lester | 367/6 |
| 3,805,265 A | * | 4/1974 | Lester | 342/44 |
| 4,347,501 A | * | 8/1982 | Akerberg | 340/539.13 |
| 4,549,264 A | * | 10/1985 | Carroll et al. | 705/32 |
| 4,649,385 A | * | 3/1987 | Aires et al. | 379/56.3 |
| 4,658,831 A | | 4/1987 | Reinhard et al. | |
| 4,675,656 A | | 6/1987 | Narcisse | |
| 4,827,943 A | | 5/1989 | Bornn et al. | |
| 4,837,568 A | | 6/1989 | Snaper | |
| 4,918,432 A | * | 4/1990 | Pauley et al. | 340/573.4 |
| 4,958,645 A | | 9/1990 | Cadell et al. | |
| 5,062,151 A | | 10/1991 | Shipley | |

(Continued)

FOREIGN PATENT DOCUMENTS

| | | |
|---|---|---|
| EP | 602 459 A2 | 6/1994 |
| EP | 0 678 838 | 10/1995 |

*Primary Examiner*—Edwin C. Holloway, III
(74) *Attorney, Agent, or Firm*—Andrus, Sceales, Starke & Sawall, LLP

(57) ABSTRACT

A location system and method for determining the location of a tagged item in a facility. In one embodiment, the location system includes a plurality of room transmitters designed to be located throughout the facility. Each room transmitter has a unique signature. The system also includes at least one item or location tag affixed or otherwise associated with an item. Each tag is operable to send a signal having information related to the signature of a room transmitter within the reception range of the tag and information related to the identity of the tag. Signals from the tags are received by one or more locating receivers. Each locating receiver is operable to determine the identity of an item tag and the likely location of the item tag within the facility based upon the signal from that tag. The invention also provides a method of locating an item in a facility. In one embodiment, the method includes positioning room transmitters in multiple areas within a facility; configuring each room transmitter to generate a unique signature; fitting items with a tag; configuring each tag to generate a signal having a location portion and a signature portion; positioning a locating receiver within the facility; and determining the likely location and identity of that tag based on the tag's signal.

60 Claims, 16 Drawing Sheets

U.S. PATENT DOCUMENTS

| | | |
|---|---|---|
| 5,153,584 A | 10/1992 | Engira |
| 5,205,294 A | 4/1993 | Flach et al. |
| 5,214,409 A * | 5/1993 | Beigel .................... 340/572.1 |
| 5,238,001 A | 8/1993 | Gallant et al. |
| 5,291,399 A | 3/1994 | Chaco |
| 5,319,363 A | 6/1994 | Welch et al. |
| 5,390,238 A | 2/1995 | Kirk et al. |
| 5,396,224 A | 3/1995 | Dukes et al. |
| 5,417,222 A | 5/1995 | Dempsey et al. |
| 5,458,123 A | 10/1995 | Unger |
| 5,459,450 A * | 10/1995 | Beghelli .................... 340/538 |
| 5,512,829 A | 4/1996 | Holczer et al. |
| 5,552,772 A | 9/1996 | Janky et al. |
| 5,579,001 A | 11/1996 | Dempsey et al. |
| 5,579,775 A | 12/1996 | Dempsey et al. |
| 5,621,384 A | 4/1997 | Crimmins et al. |
| 5,687,734 A | 11/1997 | Dempsey et al. |
| 5,689,229 A | 11/1997 | Chaco et al. |
| 5,689,238 A * | 11/1997 | Cannon et al. .......... 340/572.1 |
| 5,694,453 A * | 12/1997 | Fuller et al. ........... 340/825.49 |
| 5,694,940 A | 12/1997 | Unger et al. |
| 5,748,103 A | 5/1998 | Flach et al. |
| 5,767,791 A | 6/1998 | Stoop et al. |
| 5,855,550 A | 1/1999 | Lai et al. |
| 5,859,613 A | 1/1999 | Otto |
| 5,877,675 A | 3/1999 | Rebstock et al. |
| 5,917,425 A | 6/1999 | Crimmins et al. |
| 5,920,287 A | 7/1999 | Belcher et al. |
| 5,944,659 A * | 8/1999 | Flach et al. ................ 600/300 |
| 5,959,529 A | 9/1999 | Kail, IV |
| RE36,791 E | 7/2000 | Heller |
| 6,407,665 B2 | 6/2002 | Maloney |
| 6,407,703 B1 | 6/2002 | Minter et al. |

* cited by examiner

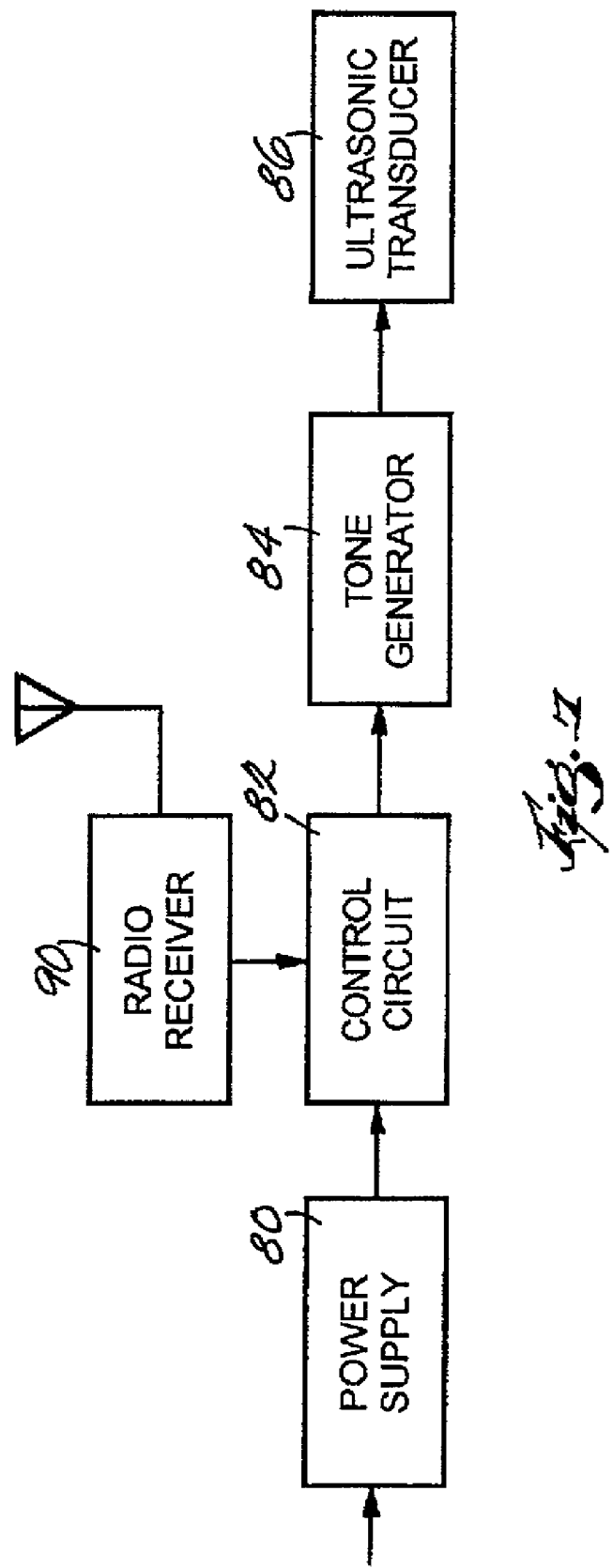

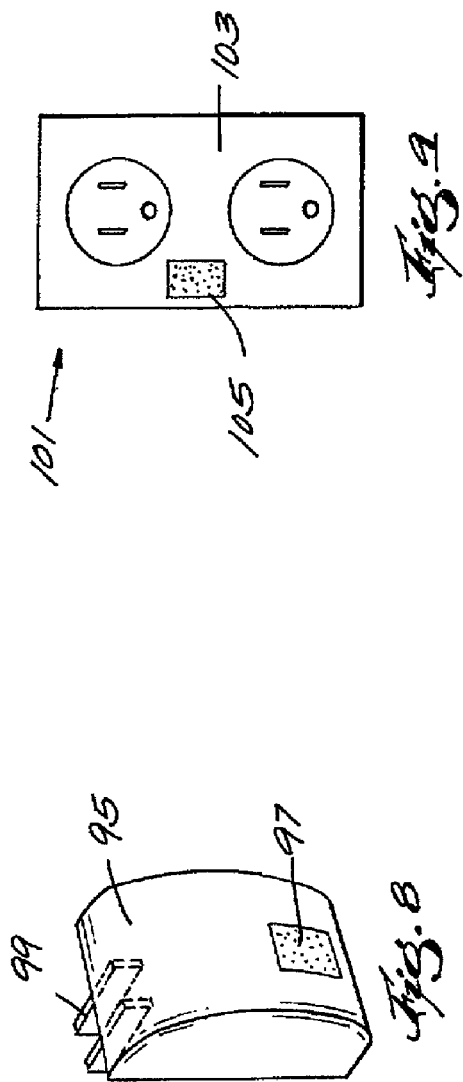
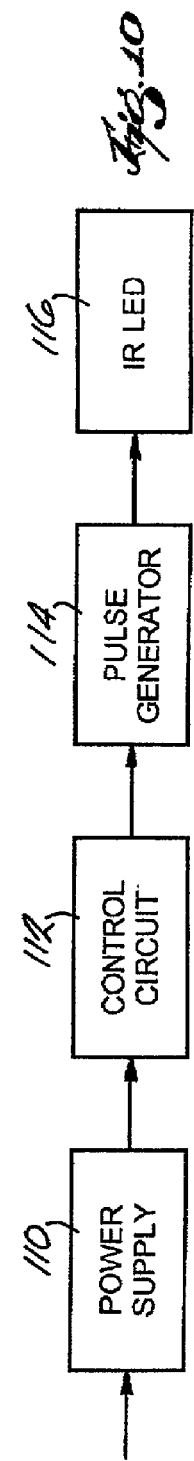

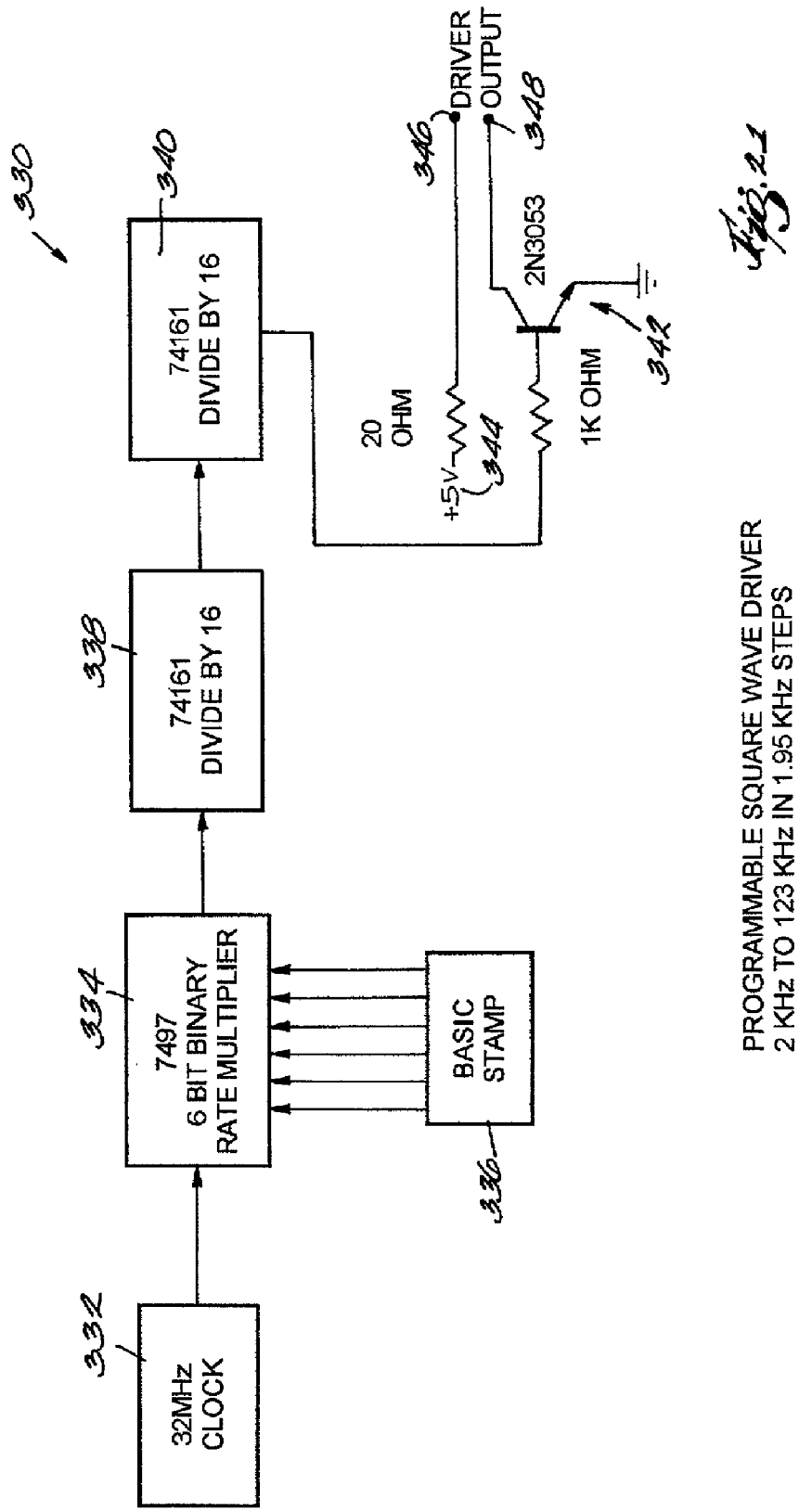

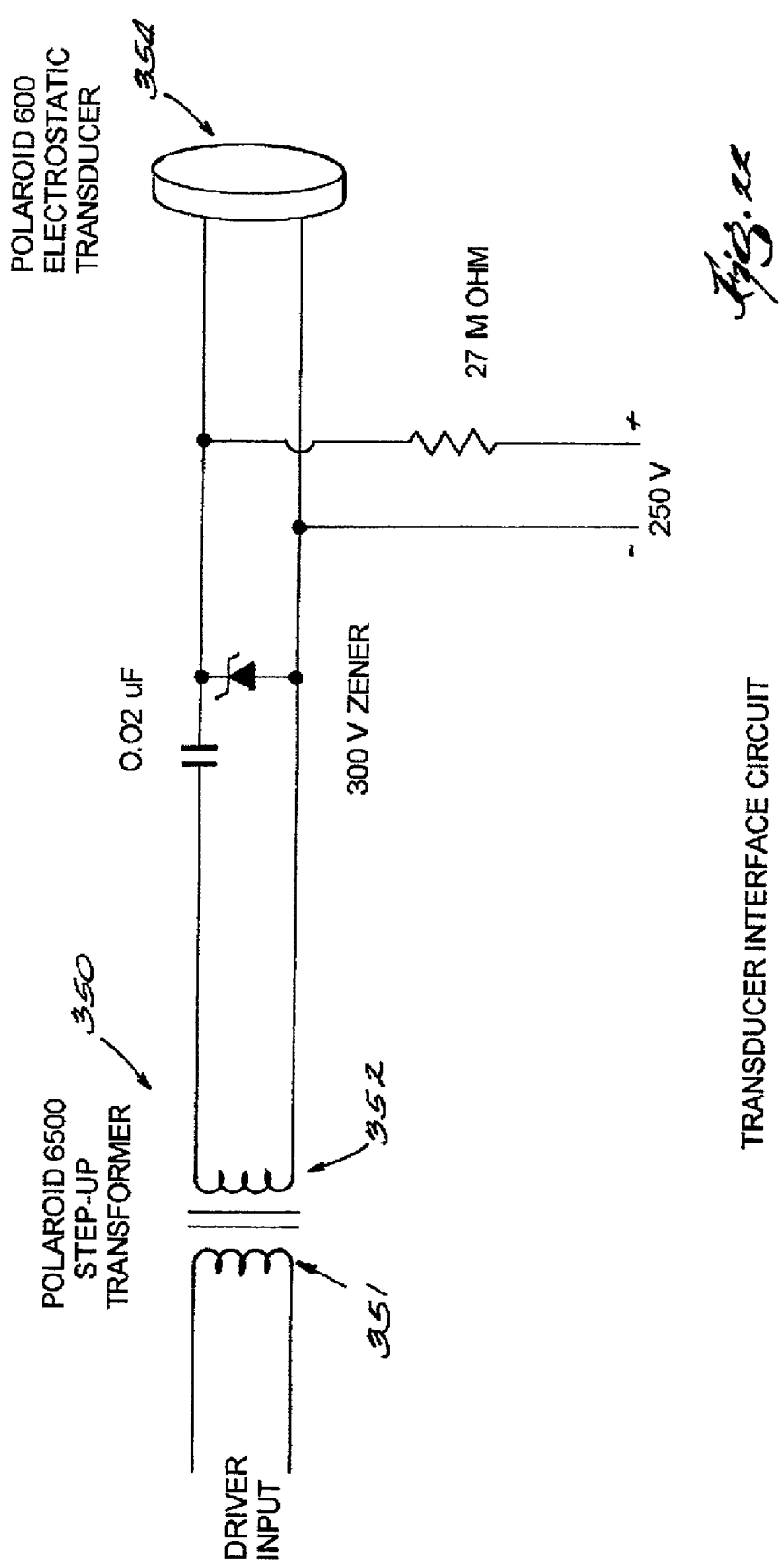

LOCATION SYSTEM USING RETRANSMISSION OF IDENTIFYING INFORMATION

BACKGROUND OF INVENTION

The present invention relates to systems used to locate equipment, people or, more broadly, items within a defined location. More particularly, the invention relates to a system to locate items within an institution, such as a hospital, school, manufacturing plant, or other facility where automated location is useful.

A variety of systems exist that are used to monitor or track equipment or people within a facility. For example, infant monitoring systems are used to alert facility personnel if an attempt is made to remove a tagged infant from a maternity ward. Other systems, such as the global positioning system (GPS) are used to determine the location of items equipped with specific transmitters. While existing systems are functional, they are often complex, expensive, and inaccurate. Further, most existing systems are not designed to work in conjunction with telemetry equipment that monitors equipment or physiological activity of people or animals at a facility.

SUMMARY OF INVENTION

Accordingly, there is a need for an improved location system that determines the location of items at a facility. There is also a need for a location system that works in conjunction with telemetry equipment.

In one embodiment, the invention provides a location system that determines the location of a tagged item in a facility. The location system includes a plurality of room transmitters designed to be located throughout the facility, generally on a room-by-room basis. In some embodiments of the invention there are multiple room transmitters in each room. In others, each room has only one room transmitter. Each room transmitter has a power supply, a control circuit, a transmitter driver, and a transmitter. Preferably, the control circuit is a programmable device or ASIC. The control circuit and transmitter driver work together to drive the transmitter to generate a unique signature.

The system also includes at least one item or location tag, but preferably multiple tags. Each tag is designed to be affixed or otherwise associated with a person, piece of equipment, or telemetry device (generically referred to as an item). Each tag has an identification module, a receiver operable to receive the signatures of the room transmitters, a power supply, and a transmitter. The transmitter is operable to send a signal having information related to the signature of a room transmitter within the reception range of the tag and information related to the identity of the tag. A control circuit controls the transmitter.

Signals from the tags are received by one or more locating receivers. Each locating receiver includes an identity decoder and a signature analyzer. Each locating receiver is operable to determine the identity of the item tag and the likely location of the item tag within the facility.

In another embodiment the invention provides a method of locating an item in a facility. The method includes positioning a number of room transmitters in multiple areas within a facility; configuring each room transmitter to generate a unique signature; fitting one or more items with a location tag; configuring each location tag to generate a signal having information regarding the identity of the location tag and the signature of any room transmitter within a reception range of the respective tag; positioning at least one locating receiver within the facility within the transmission range of at least one location tag; and determining the likely location and identity of the location tag based on the signal of the location tag.

The method may also include coupling a control computer to the at least one locating receiver and generating an output indicative of the location and identity of the location tag. The output may be displayed on a monitor coupled to the computer.

The room transmitters can take a variety of forms and in certain forms they are equipped to provide synchronization of their transmissions. Thus, in one embodiment of the invention, the method of locating an item includes synchronizing the room transmitters within a room so that each room transmitter sends a unique, time dependent signal. The method can also include configuring a first room transmitter to send a time varying signal that varies between a first frequency and a second frequency and configuring a second room transmitter to send a time varying signal that varies between a third frequency and a fourth frequency during the same time that the first transmitter sends its time varying signal.

Synchronization of the system provides enhanced location capabilities. Thus, the method of locating an item may also include determining the location of a location tag based on the offset of the time varying signals from the first and second room transmitters. Still further synchronization techniques and benefits are addressed below.

As is apparent from the above, it is an advantage of the invention to provide a method and system of locating items in a facility. Other features and advantages of the invention will become apparent by consideration of the detailed description and accompanying drawings.

BRIEF DESCRIPTION OF DRAWINGS

FIG. 7 is a schematic diagram of a still further alternative embodiment of circuitry used in the room transmitters of FIGS. 2 and 3.

FIG. 8 is one embodiment of an infrared room transmitter useful in embodiments of the invention.

FIG. 9 is another embodiment of an infrared room transmitter useful in embodiments of the invention.

FIG. 10 is a schematic diagram of an embodiment of circuitry used in the room transmitters of FIGS. 8 and 9.

FIG. 21 is a schematic diagram of an ultrasonic driver circuit.

FIG. 22 is a schematic diagram of a transformer coupling circuit used in combination with the driver circuit of FIG. 21 to drive an ultrasonic transducer.

DETAILED DESCRIPTION

Figure 1:
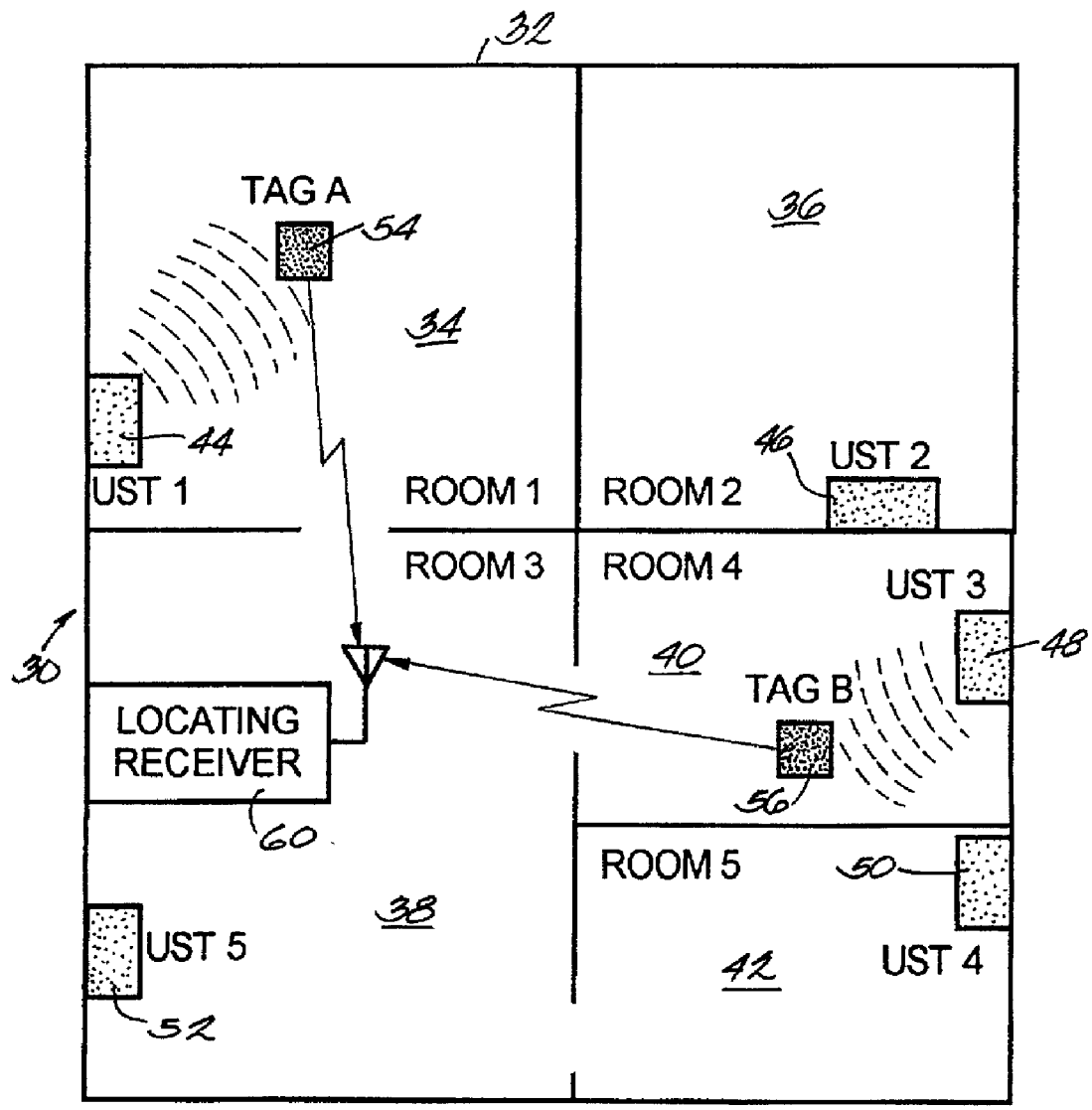
FIG. 1 is a schematic diagram of a facility equipped with a location system of one embodiment of the invention.

Before embodiments of the invention are explained, it is to be understood that the invention is not limited in its application to the details of the construction and the arrangements of the components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

FIG. 1 illustrates a system 30 of one embodiment of the invention installed at an exemplary facility 32. The facility 32 includes five rooms: room 34, room 36, room 38, room 40, and room 42. Each of the rooms 34–42 is equipped with a room transmitter 44–52. In the embodiment shown, each transmitter is an ultrasonic transmitter. Preferably, each room transmitter generates a unique signal and the location and the signal or a representation of the signal generated by each room transmitter is stored in memory of a computer or similar device.

The system 30 includes two location tags 54 and 56. Each tag 54, 56 includes, in general terms, a receiver or sensor to receive the signals from the room transmitters 44–52. In the embodiment shown, the tag 54 is within the transmission range of the room transmitter 44 in room 34 and the tag 56 is within the transmission range of the room transmitter 48 in room 40. Each tag 54, 56 also includes a transmitter that, in the embodiment shown, sends a radio frequency (RF) signal to a locating receiver 60. (It should be understood, however, that the tags could use a variety of wireless communication methodologies other than RF communications.) The tags 54 and 56 are affixed or otherwise associated with an item. As the item is moved through the facility 32 the tag is also moved. Each tag transmits data that is representative of the signals it receives from room transmitters in the facility as they move and as room transmitters come within the reception range of the tags. Each tag also transmits information concerning its own identity. Preferably, the tags re-transmit the signal or a representation of the signal from the room transmitters. The tags are tuned to transmit to one or more locating receivers 60. The number of locating receivers can be adjusted to optimize system cost and facility coverage.

At least one of the locating receivers 60 is coupled to a central station or computer (discussed below) where information from the tags can be used to identify the location of the item to which a tag is affixed or associated with. As noted and as will be discussed further, it is preferred that each tag have a unique identifier or identifying code. When so designed, the signal from the tag includes an identification portion as well as a location portion. The location portion is representative of the room transmitter signal in the room or area in which the tag is located. Preferably, the locating receiver determines the identity of each tag that is transmitting a signal to the locating receiver. It is also preferred that the locating receiver determine the most likely location of the tag by comparing preprogrammed location and signature information to the location information in the location portion of the tag's signal. The information from the locating receiver is delivered to a control computer that may then display or otherwise indicate the identity and location of the tagged item.

Figure 2:
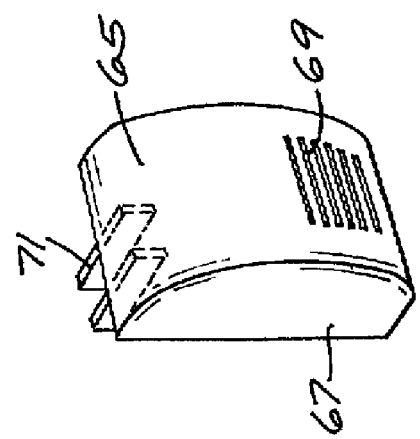
FIG. 2 is a schematic diagram of a one embodiment of an ultrasonic room transmitter useful in embodiments of the invention.

FIG. 2 illustrates a room transmitter 65 that can be used in embodiments of the invention including the system 30. The room transmitter 65 is an ultrasonic transmitter and has a housing 67 with a grill 69 to permit propagation of an ultrasonic signal through the housing. The room transmitter 65 is designed to be mounted in an electrical outlet by two electrical connectors 71. The transmitter configuration shown in FIG. 2 is convenient because power for the room transmitter is readily available from the electrical outlet. However, batteries, solar cells, and other power supplies could be readily substituted and the room transmitter 65 mounted in a variety of positions in a room or area of a facility.

Figure 3:
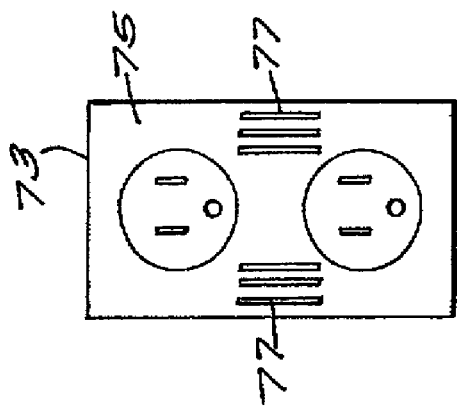
FIG. 3 is a schematic diagram of another embodiment of an ultrasonic room transmitter useful in embodiments of the invention.

FIG. 3 illustrates an alternative configuration, a room transmitter 73 that is designed to fit inside the recess of an electrical wall outlet. The room transmitter 73 has an outlet faceplate 75 with one or more grills 77.

Figure 4:
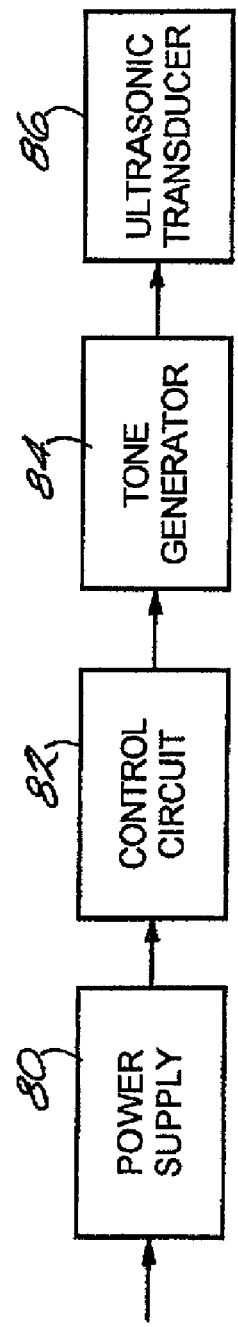
FIG. 4 is a schematic diagram of one embodiment of circuitry used in the room transmitters of FIGS. 2 and 3.

Regardless of their exact form, the room transmitters 65 and 73 can be configured to use the same control circuitry. As shown in FIG. 4, each ultrasonic room transmitter 65, 73 includes a power supply 80, which may be coupled to a power source such as a 110 VAC power outlet. The power supply 80 powers a control circuit 82, which may be a microprocessor, other programmable device, or an application specific integrated circuit (ASIC). Each room transmitter 65, 73 also includes a tone generator 84 and a transducer 86. The control circuit 82 controls the tone generator so as to produce a unique tone or set of tones that make up a signature. The signature may include a single fixed tone, multiple fixed tones, a known time sequence of different tones, one or multiple tones turned on and off at known intervals, one or multiple frequency modulated tones, one or multiple tones digitally on-off modulated with a digital identification signal, or one or multiple phase modulated tones. Of course, other techniques for creating signatures could be used and would be apparent to those of ordinary skill in the art. The signature or set of tones is delivered to the transducer 86, which converts the electrical impulses of the signature to sound. The sound propagates through the grill 69, 77 and floods the area surrounding the room transmitters.

Figure 5:
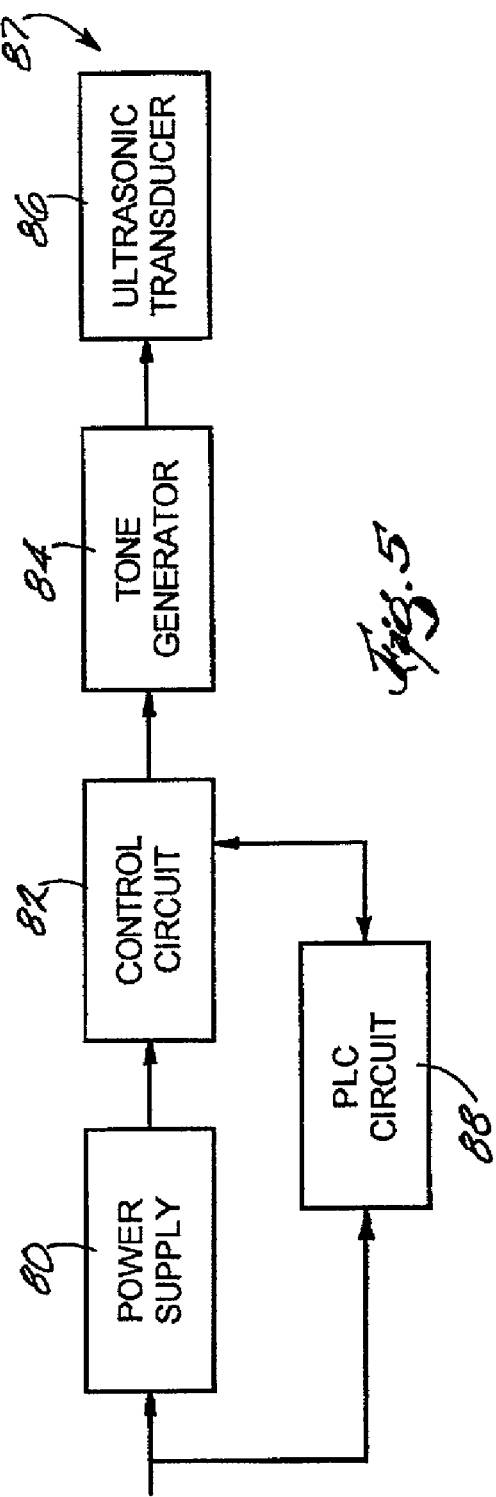
FIG. 5 is a schematic diagram of an alternative embodiment of circuitry used in the room transmitters of FIGS. 2 and 3.
Figure 6:
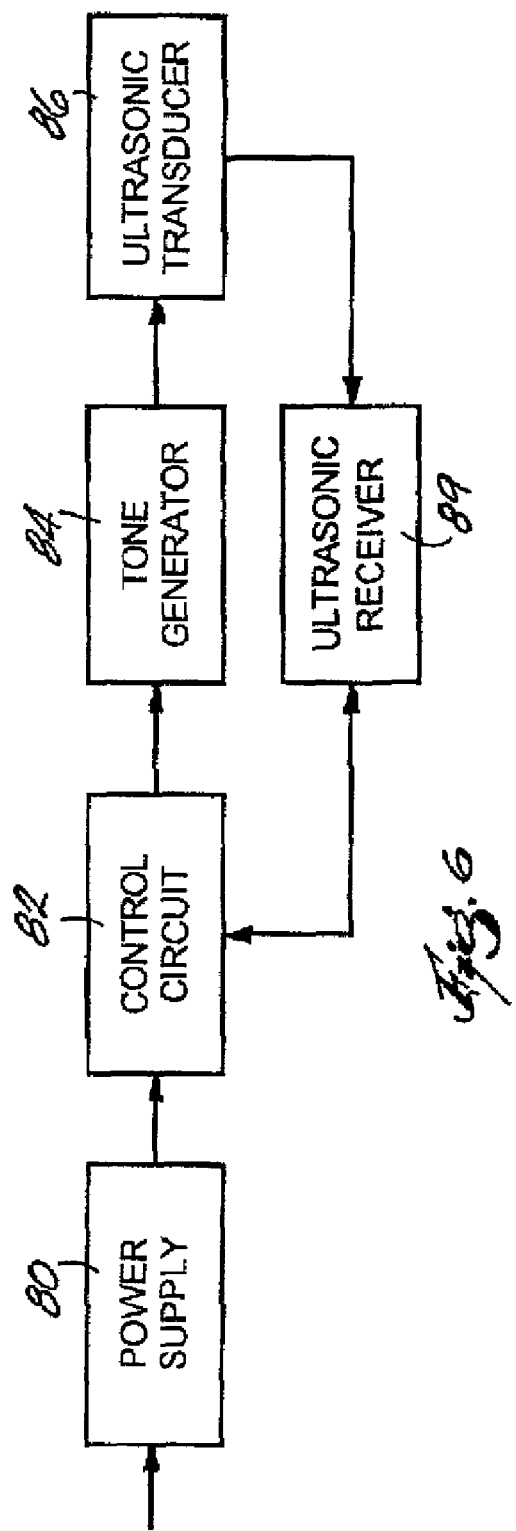
FIG. 6 is a schematic diagram of an alternative embodiment of circuitry used in the room transmitters of FIGS. 2 and 3.

FIG. 5 illustrates yet another optional embodiment of the circuitry for the room transmitters 65 and 73, room transmitter circuitry 87. The room transmitter circuitry 87 includes a power line carrier (PLC) communications circuit 88, such as a consumer electronics bus (CEBus) circuit. The PLC communications circuit 88 allows communication and reconfiguration of the control circuit 82 via power line communications. The communications link provided through the PLC communications circuit 88 allows multiple ultrasonic transmitters to communicate between themselves for synchronization purposes (discussed below). Or course, other techniques to provide inter-transmitter communication, including wireless methods, could be used. For example, FIG. 6 illustrates the transmitter circuitry with an ultrasound receiver 89, which allows inter-transmitter communication. FIG. 7 illustrates another embodiment of the room transmitter circuitry having a radio receiver 90. When equipped with the radio receiver 90, the room transmitter 65 and 73 may listen to radio transmissions from nearby location tags.

FIGS. 8 and 9 illustrate ultraviolet or infrared room transmitters that may be used in the system 30. A first infrared room transmitter 95 is shown in FIG.8. The first infrared room transmitter 95 has a window 97 and electrical connectors 99. A second infrared room transmitter 101 is shown in FIG. 9. The second infrared room transmitter is designed to fit in the recess of an electrical outlet and has a faceplate 103 with a window 105. In operation, the room transmitters 95 and 101 are similar to the room transmitters 65 and 73, except that they rely on infrared rather than ultrasonic energy and windows 97, 105 to allow the transmission of infrared radiation rather than grills designed to transmit ultrasonic radiation.

The room transmitters 95 and 101 share common control circuitry. As shown in FIG. 10, each infrared room transmitter includes a power supply 110, a control circuit 112, a pulse generator 114, and an infrared device 116, such as a light emitting diode (LED). The circuitry shown in FIG. 10 is similar to that shown in FIG. 4, except that it is adapted for infrared energy. The pulse generator 114 is controlled by the control circuit 112 (preferably a microprocessor, other programmable device, or ASIC) so that the infrared device 116 produces a room transmitter signature in the form of a series of infrared signals. As with the ultrasonic room transmitters 65 and 73, the signature may be a single fixed frequency, multiple fixed frequencies, a known time sequence of different frequencies, one or multiple frequencies turned on and off at known intervals, one or multiple frequency modulated signals, one or multiple signals digitally on-off modulated with a digital identification signal, or one or multiple phase modulated signals. Other signatures are also possible as would be apparent to those of ordinary skill in the art.

It should be understood that the room transmitters, whether in ultrasonic, infrared, or other form operate in such a way that the control circuit 82, 112 operates in connection with a driver (such as the tone generator 84 or pulse generator 114) to cause a transmitter (such as a transducer, infrared device, or other radiation emitting device) to transmit or broadcast a signature. Thus, the invention is not limited to the infrared (or ultraviolet) or ultrasonic embodiments described herein, but could be adapted to other types of radiation as would be apparent to those of ordinary skill in the art.

Figure 11:
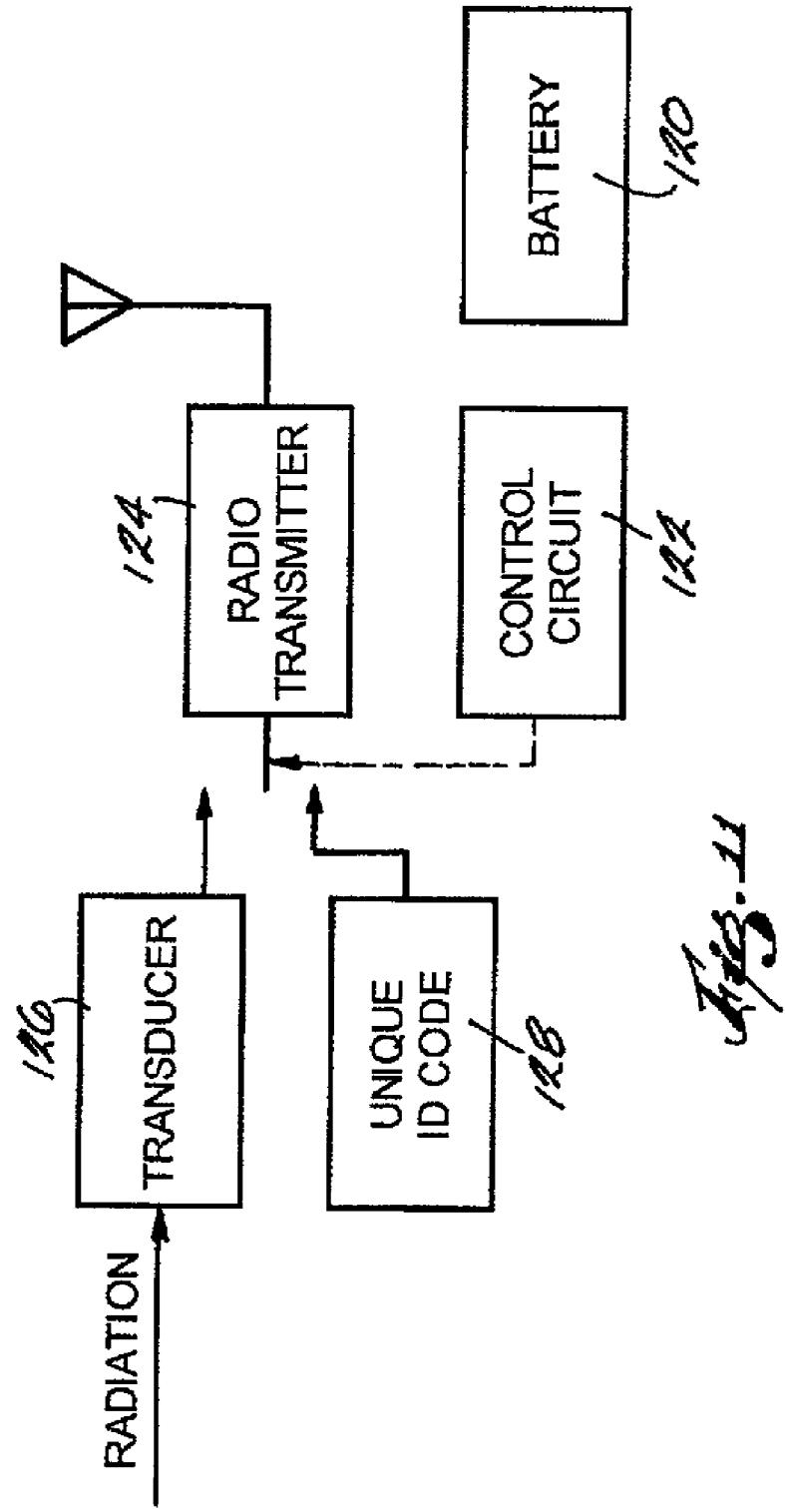
FIG. 11 is a schematic diagram of circuitry used in an item tag useful in embodiments of the invention.

FIG. 11 shows the architecture of the location tags 54 and 56. Each tag 54, 56 includes a power source 120, such as a battery, a control circuit 122, a radio transmitter 124, a transducer 126, which is used to receive radiation energy corresponding to the type of radiation emitted by the room transmitters used for the particular application. Each tag also includes an identification module 128 that has a unique identification code that identifies each particular tag. Preferably, the control circuit 122 (which may be an ASIC or any of several microcontrollers such as the 80C51 from Intel or Phillips) runs in a very low power mode (sleep mode) for most of the time. At selected intervals, such as every 15 seconds, the control circuit 122 wakes up, and turns on the radio transmitter 124. (The intervals need not be periodic.) The radio transmitter 124 sends a signal, which may include a preamble for purposes of allowing the locating receiver (discussed below) to lock onto the signal from the radio transmitter 124. The control circuit 122 then causes the identification code from the identification module 128 to be sent, followed by radio transmission of the incoming signals detected by the transducer 126. Transmission of the detected signals continues for a predetermined period of time, such as 50 milliseconds, after which the control circuit 122 turns off the radio transmitter 124 and returns to the sleep mode. Preferably, the tag 54, 56 uses a modulation scheme such as amplitude modulation or frequency modulation to transmit its signal to the locating receiver. If desired, a more complex modulation scheme such as time division multiple access (TDMA) or code division multiple access (CDMA) may be used. In the case of a CDMA transmission, the CDMA code may take the place of some or all of the identification code from the identification module 128.

Figure 12:
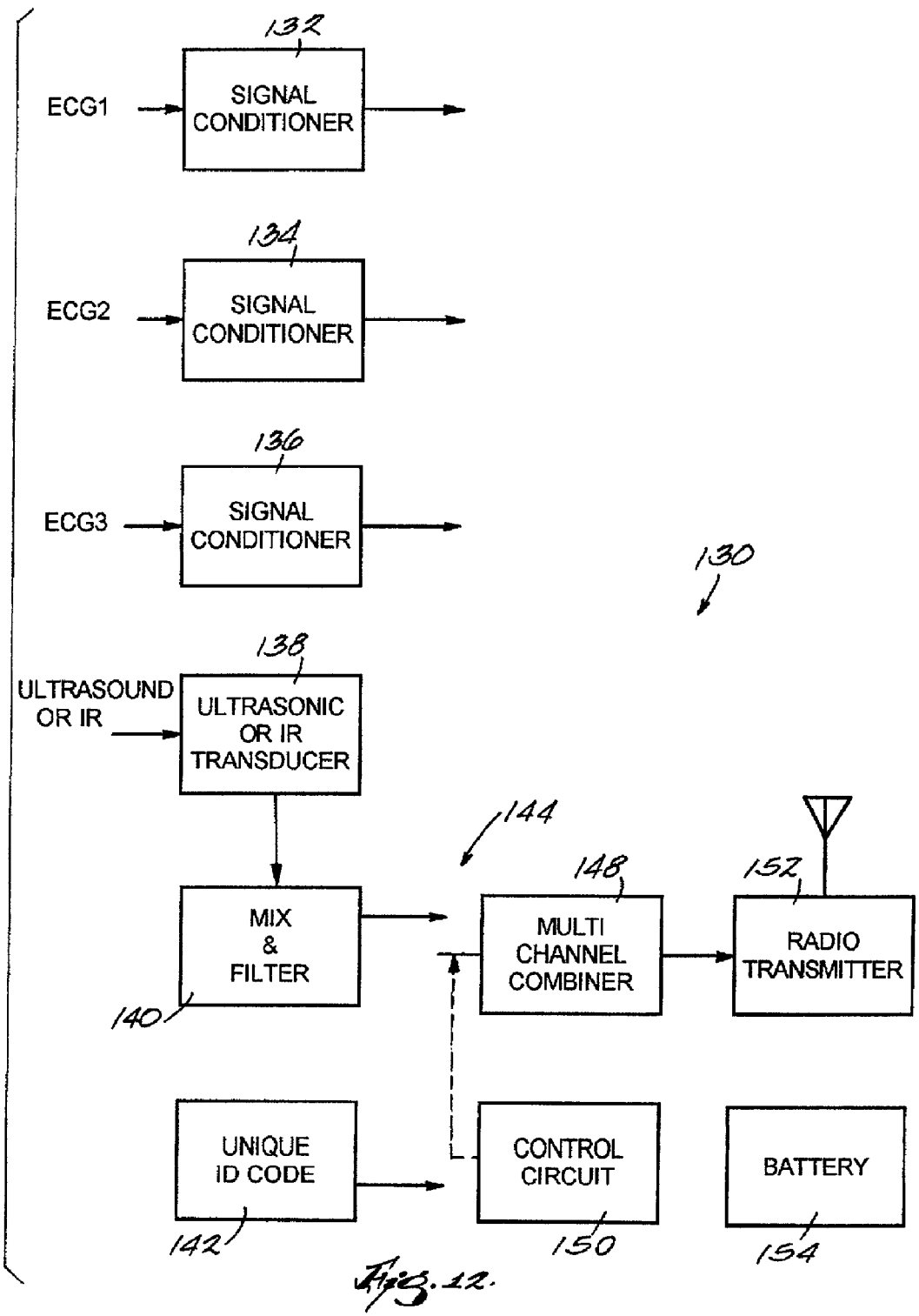
FIG. 12 is a schematic diagram of a telemetry device equipped with an item tag.

As noted above, the invention is, in one embodiment, designed to work in connection with telemetry equipment, which may, for example, monitor physiological activity of a patient or activity of a device. FIG. 12 illustrates an exemplary telemetry device 130, which in functional terms combines the functions of a tag, such as the tags 54 or 56, and a standard telemetry device. The device 130 includes three signal conditioners (such as A-to-D converters) 132, 134, and 136 that condition three telemetry signals, which in the example shown are ECG signals. The device 130 also includes a transducer 138 (or, more broadly, a receiver) that receives signals from the one or more room transmitters within the facility 32, such as the room transmitters 65, 73, 99, 101, or the like. The transducer 138 can be configured to monitor the environment continuously or to sample signals from room transmitters intermittently. The signal or signals sensed by the transducer 138 are conditioned in a filter and mixer module 140. The filter and mixer module 140 processes the signal or signals received by the transducer 138 by, for example, calculating the frequency of the ultrasound or infrared signal and outputting only the processed value (the frequency). Further, the filter and mixer module 140 may be designed to modulate the received signal on a transmission signal of the device 130 or to mix the received signal to create a heterodyned signal.

The device 130 also includes an identification module 142 that stores a unique identifier for the device 130. Outputs of the conditioners 132, 134, and 136; the filter and mixer module 140; and the identification module 142 are linked to a single throw, five pole switch 144 (shown schematically). The output of the switch 144 is delivered to a multi-channel combiner 148. The multi-channel combiner 148 also receives control input from a control circuit 150, which may be a microprocessor, other programmable device, or an ASIC. The operation of the control circuit 150 is similar to the control circuit 122, discussed above. The output of the multi-channel combiner 148 is delivered to a radio transmitter 152. The radio transmitter 152 generates an output having a location portion, the processed signal received by the transducer 138, and an identification portion, the identification code from the identification code module 142. The device 130 is powered by a power supply 154.

Figure 13:
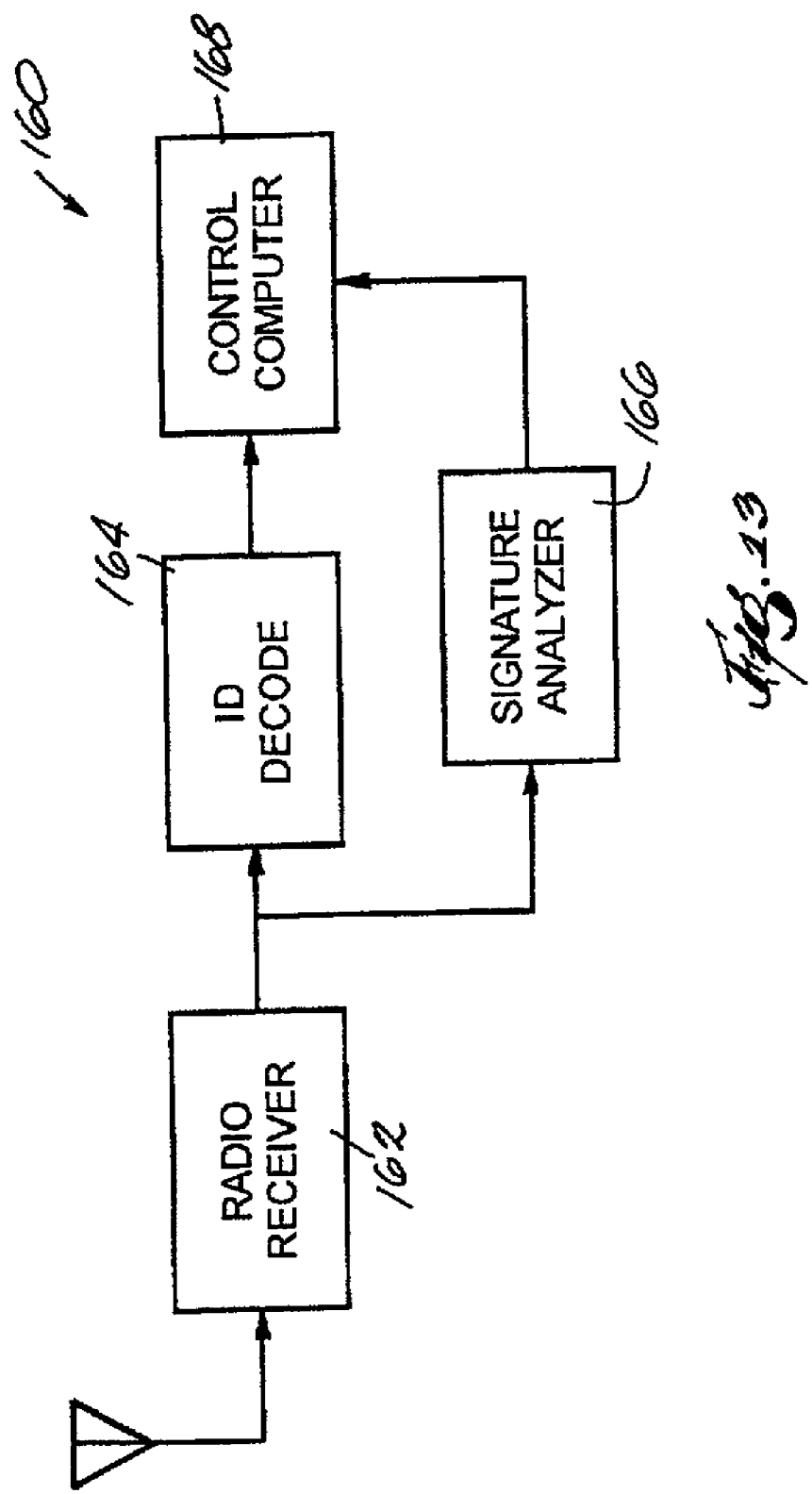
FIG. 13 is a schematic diagram of a locating receiver useful in embodiments of the invention.

FIG. 13 illustrates an exemplary locating receiver 160, which may be used in the embodiments described including the system 30. The locating receiver 160 includes a radio receiver 162 to receive transmissions from the tags 54 and 56 and any other tags that may be used in an implementation of the invention. The output of the radio receiver 162 is sent to an identity decoder 164 that determines the identity of the tag that is sending the signal being received by the radio receiver 162. The output of the radio receiver 162 is also sent to a signature analyzer 166. The signature analyzer 166 compares the signal from the radio receiver 162 with recorded and known signatures for all room transmitters used in the implemented system. Each recorded signal is also associated with a location of each room transmitter in the system 30. When a match is found, the signature analyzer 166 produces an output corresponding to the likely location of the tag within the facility 32, i.e., the location of the room transmitter(s) whose signal(s) was (were) received by the tag. The outputs from the identity decoder 164 and signature analyzer 166 are delivered to a control computer 168. The control computer 168 may be located at any convenient location within or remote to the locating receiver 160 or even the facility 32. The control computer, as would be apparent to those of ordinary skill in the art, may output information on a monitor (not shown) or other output device to indicate the location of any tagged item or telemetry device 130.

Figure 14:
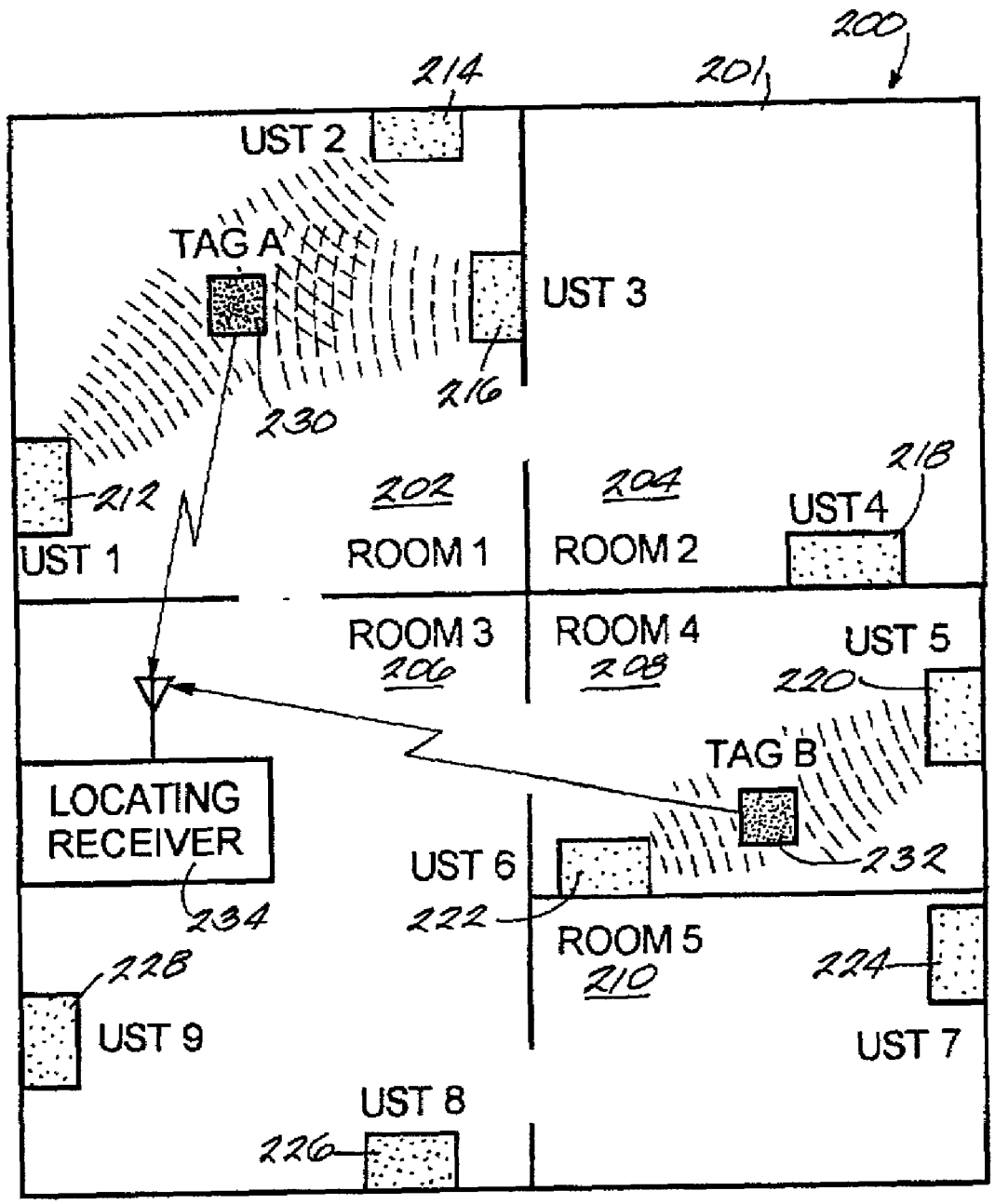
FIG. 14 is a schematic diagram of a facility equipped with a location system of an additional embodiment of the invention.

FIG. 14 shows a system 200, which is an alternative to the system 30. The system 200 is installed in a facility 201 that has five rooms 202–210. Nine room transmitters (in this case ultrasonic transmitters) 212–228, two tags 230 and 232, and one locating receiver 234 are positioned in the rooms. When tag 230 is transmitting, the strongest ultrasound signals sent to the locating receiver 234 are the signals from room transmitters 212, 214, and 216. The locating receiver 234 determines that tag 230 is located in room 202 based on the radio signal from tag 230. Similarly, the locating receiver 234 can determine that tag 232 is in room 208 based on the signal from tag 232.

Figure 15:
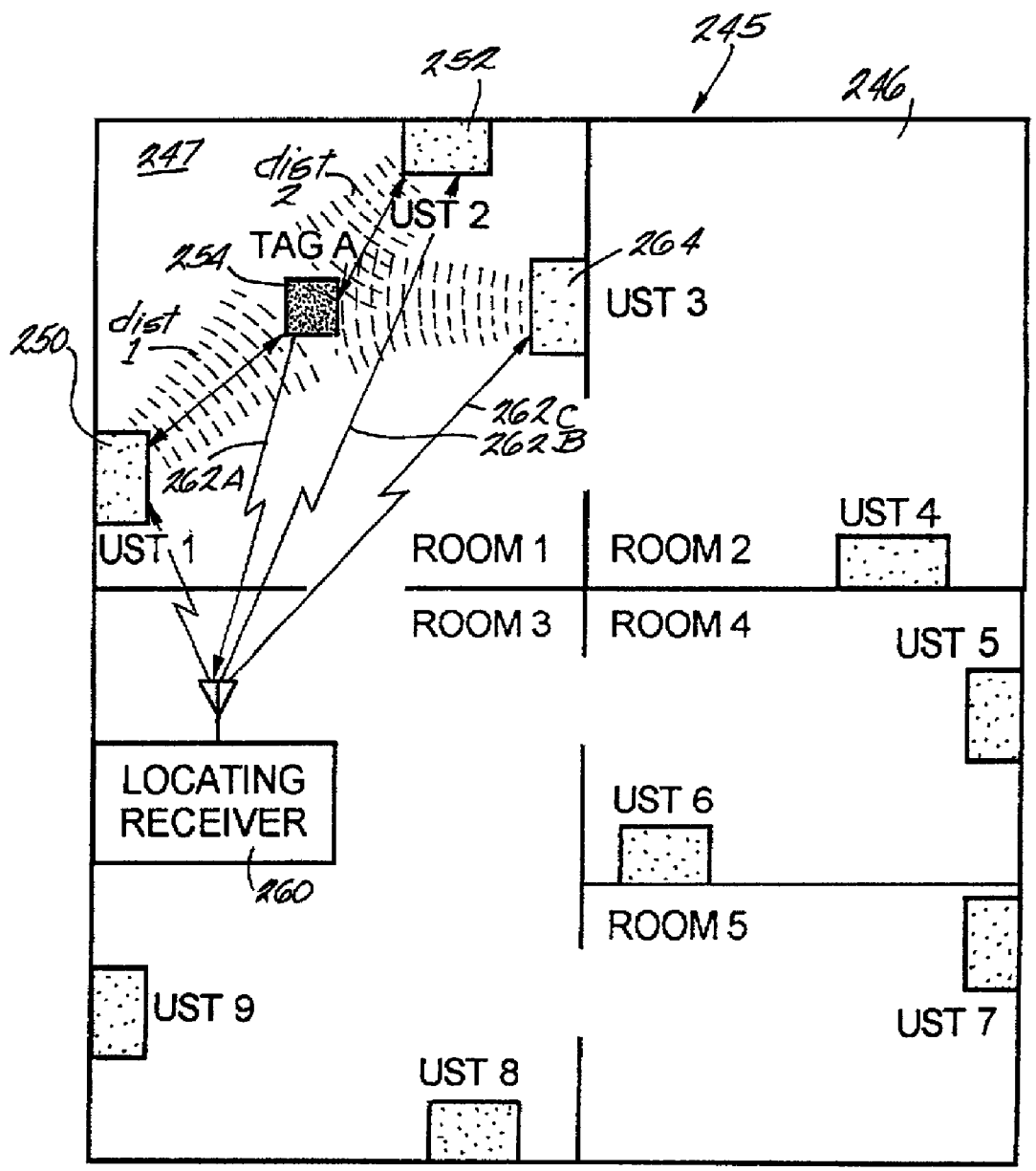
FIG. 15 is a schematic diagram of a facility equipped with a location system of another additional embodiment of the invention.
Figure 17:
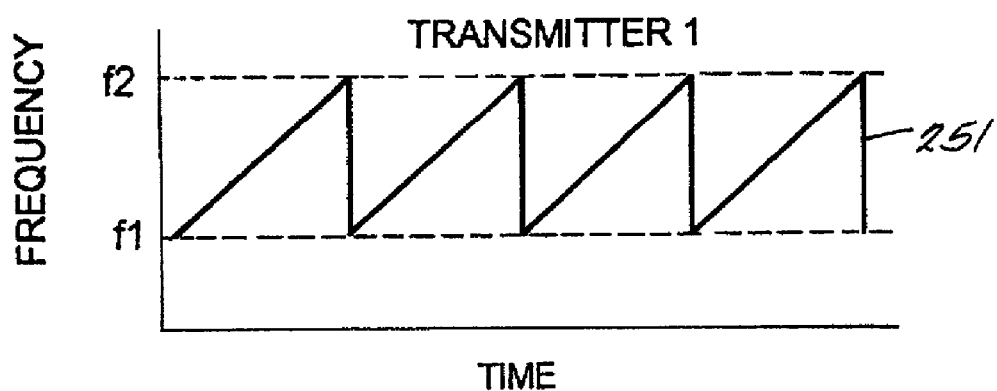
FIG. 17 is schematic trace of a signal from a room transmitter of one embodiment of the invention.
Figure 18:
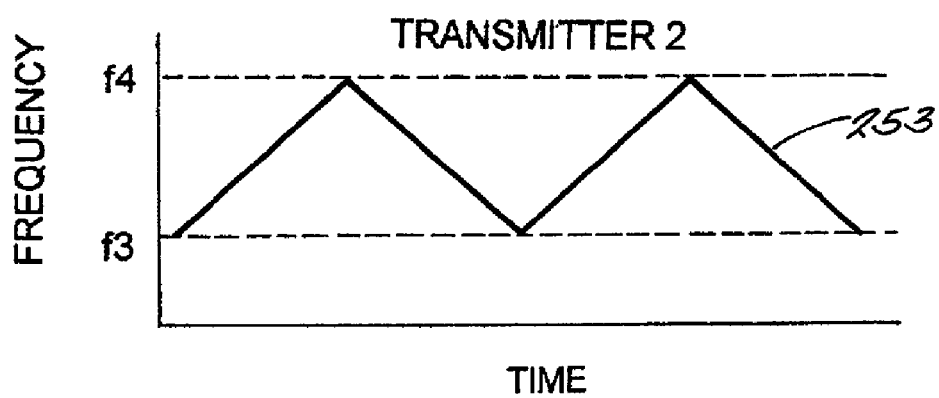
FIG. 18 is schematic trace of a signal from a room transmitter of another embodiment of the invention.
Figure 20:
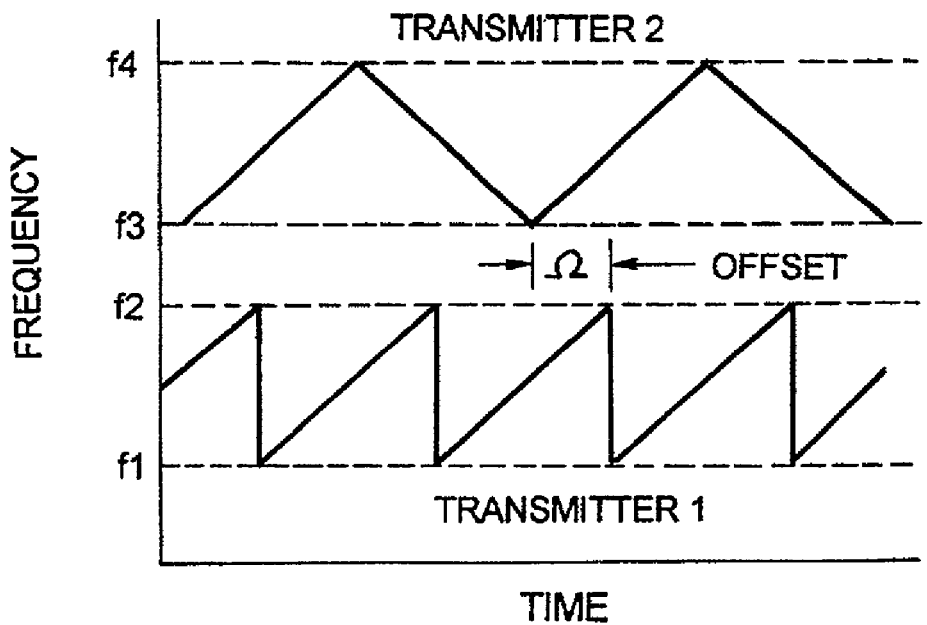
FIG. 20 is schematic trace of the signals from two room transmitters illustrating a non-synchronized condition.

Another method of locating tags or telemetry devices within a room is to synchronize the room transmitters within a room and to have each room transmitter send a unique, time dependent signal. FIG. 15 illustrates a system 245 installed in a facility 246 having a room 247. A room transmitter 250 within the room 247 sends a time varying signal 251 (FIG. 17) that varies between a first frequency, f1, and a second frequency, f2, during the same time that a transmitter 252 sends a time varying signal 253 (FIG. 18) that varies between a third frequency, f3, and a fourth frequency f4. The distance from a tag 254 to the room transmitter 250 is dist1, and the distance from the tag 254 to room transmitter 252 is dist2. If dist1< > dist2, then the signal received by the tag 254 will look like that shown in FIG. 20, where the two signals 251 and 253 are offset by an amount Ω (in seconds). The offset Ω multiplied by the speed of sound (when ultrasonic room transmitters are used) is equal to the difference dist1−dist2. If a room is insonified (filled with sound) by three (or more) ultrasonic room transmitters that have known, time-varying and synchronized frequency patterns, then the location of the tag 254 within the room can be accurately determined using triangulation and the offsets of the signals. An advantage of this synchronization scheme is that the transmitter synchronization is local, and does not have to be communicated to any central computing device.

Figure 19:
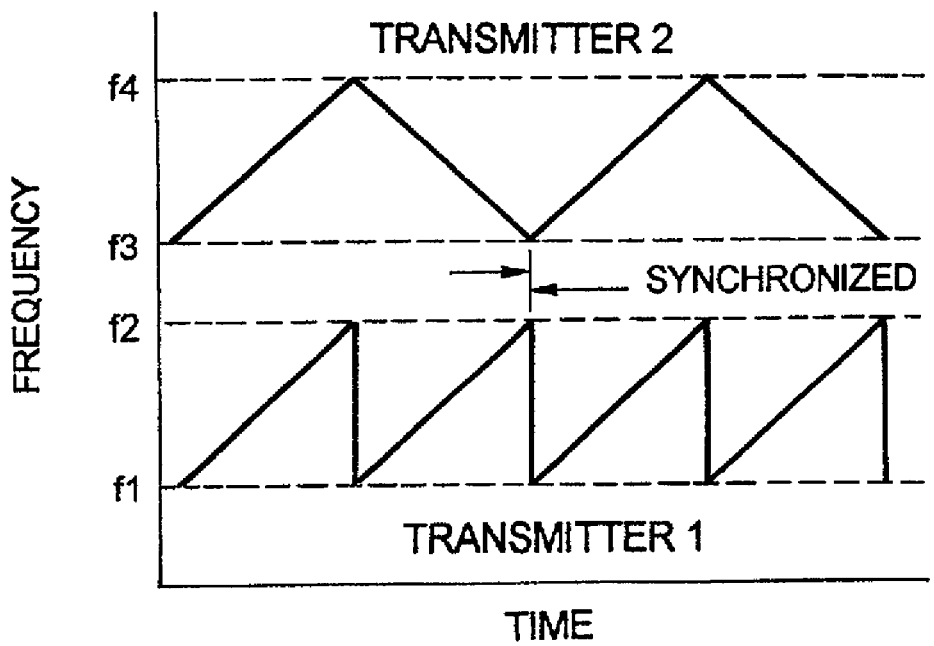
FIG. 19 is schematic trace of the signals from two room transmitters illustrating a synchronized condition.

Other location mechanisms can be used to more accurately locate tags within a room. As noted above, in one embodiment (shown in FIG. 7), room transmitters may be equipped with radio receivers. The system in 245 of FIG. 15 can be modified with a locating receiver 260 having the ability to transmit radio signals 262A–C to room transmitters 250 and 252 and a room transmitter 264. The signals 262A–C are synchronization codes that cause the transmitters 250, 252, and 264 to transmit their respective ultrasound signals at known times in a synchronized fashion as is shown for two exemplary transmitters in FIG. 19. Tag 254 receives these ultrasound signals after a delay caused by the distance from each room transmitter divided by the speed of sound. The received ultrasound is then transmitted from the tag 254 to the locating receiver 260. In this manner, the distance of tag 254 from each room transmitter 250, 252, and 264 is accurately calculated. This allows accurate determination of the location of tag 254 within room 247.

In order for the technique just described to provide optimal results it is necessary that the locating receiver 260 know the timing of the ultrasound pattern transmitted from each room transmitter. The accuracy with which this must be known is about 1 millisecond in order to calculate the tag position within one foot. While synchronization using radio transmissions from the locating receiver can be used to create timing assurance, several other methods of synchronization such as other wireless communication (infrared and other spectral frequencies) and wired communications can be used, including those discussed below.

Another method of synchronization can be implemented when the room transmitters are equipped with a radio or other secondary transmitter, as shown by the example illustrated in FIG. 7. When equipped with a secondary transmitter, each room transmitter periodically sends a synchronization signal to the locating receiver, such as once per minute or even as infrequently as once per hour, to maintain known timing.

Another method of synchronization may be implemented using PLC communication and room transmitters configured as the one shown in FIG. 5. When equipped with a PLC circuit accurate time synchronization between the locating receiver and the room transmitters can be easily achieved because the timing of signals is communicated to all devices connected to the power line.

Figure 16:
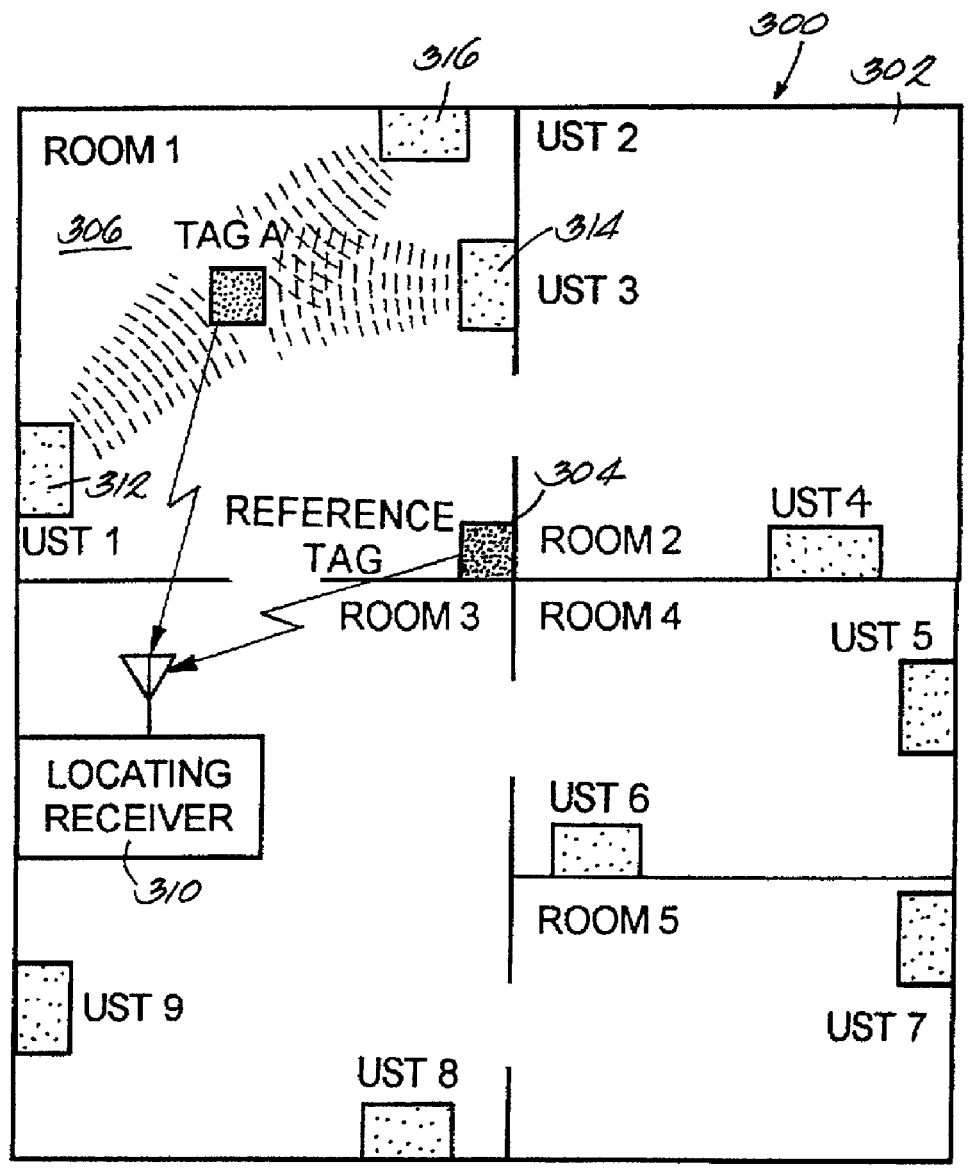
FIG. 16 is a schematic diagram of a facility equipped with a location system of yet another additional embodiment of the invention.

Yet another method of synchronization can be implemented using a reference tag. FIG. 16 illustrates a system 300 in a facility 302 with a reference tag 304 in a room 306. The reference tag 304 is placed in a known, fixed location within the room 306. The reference tag 304 transmits a signal on a periodic basis, such as once per minute. A locating receiver 310 receives the signals from the reference tag 304 and calculates the timing of three room transmitters 312, 314, and 316 from the received signal.

Another method of synchronization can be implemented when using a room transmitter in the form shown in FIG. 6. In this embodiment, all ultrasonic transmitters also have ultrasonic receivers. Within a room each room transmitter listens to the signals from the other room transmitters. The room transmitters maintain a constant relative synchronization between one another. This relative synchronization allows the locating receiver to calculate positions of tags within the rooms of a facility.

FIG. 21 shows a preferred embodiment of a programmable squarewave driver 330 for the ultrasonic room transmitters (such as room transmitters 65, 73, and 212–228). The squarewave driver 330 includes a clock circuit 332 that provides a clock signal to a binary rate multiplier 334. The binary rate multiplier receives 'n' signals from a microcontroller 336, where 'n' corresponds to the number of bits handled by the binary rate multiplier 334. The microcontroller 336 generates an initial control signal based on the room location of the circuit, i.e., the room in which the circuit is present. The output from the binary rate multiplier 334 is sent to a binary counter 338 configured to perform a divide by 16 operation. The output of the binary counter 338 is sent to a second binary counter 340, also configured to perform a divide by 16 operation. The output of the binary counter 340 is delivered to a drive transistor 342. The output of drive transistor 342 and a bias voltage from a rail source 344 are provided as a two-line output at pins 346 and 348. As best seen by reference to FIG. 22, the two-line output is delivered to a step-up transformer 350, having a primary 351 and a secondary 352. The secondary 352 drives an ultrasonic transducer 354. Through both network and spectral analysis, the inventors have found that driving the ultrasonic transducer with a squarewave driver provides distinct frequencies of adequate spectral purity at a relatively low cost.

As can be seen from the above, the invention provides, among other things, a method and system that locates items within a facility. Various features and advantages of the invention are set forth in the following claims.

What is claimed is:

1. A method of locating an item in a facility, the method comprising:
    positioning a number of room transmitters in multiple areas within a facility;
    configuring each room transmitter to generate a unique, modulated signature;
    wherein configuring each room transmitter includes configuring a first room transmitter to send a time varying signal that varies between a first frequency and a second frequency and configuring a second room transmitter to send a time varying signal that varies between a third frequency and a fourth frequency during the same time that the first transmitter sends its time varying signal;
    wherein configuring each room transmitter includes synchronizing the room transmitters within a room so that each room transmitter sends a unique, time dependent signal;
    fitting one or more items with a location tag, at least one of the items operable to acquire physiologic data from a patient associated with the item;
    configuring each location tag to regularly generate a signal having information regarding the identity of the location tag, the physiologic data, and the signature of any room transmitter within a reception range of the respective tag;
    positioning at least one locating receiver within the facility;
    determining the likely location and identity of the location tag based on the signal of the location tag; and
    wherein determining the likely location includes determining the location of the location tag based on the offset of the time varying signals from the first and second room transmitters.

2. A method as claimed in claim 1, further comprising coupling a control computer to the at least one locating receiver and generating an output indicative of the location and identity of the location tag.

3. A method as claimed in claim 1, further comprising configuring each room transmitter with a secondary receiver.

4. A method as claimed in claim 3, further comprising sending a signal from at least one locating receiver to each room transmitter.

5. A method as claimed in claim 4, further comprising
    sending a synchronization code to each room transmitter that causes each room transmitter to transmit its respective signature signal at a known time; and
    determining the location of a location tag based on the time that the location tag receives signature signals from the room transmitters.

6. A method as claimed in claim 1, further comprising configuring each room transmitter with a PLC circuit.

7. A method as claimed in claim 1, further comprising positioning a reference tag in a location within the facility.

8. A method as claimed in claim 7, further comprising configuring the reference tag to transmit a reference signal on a periodic basis.

9. A method as claimed in claim 1, further comprising configuring each room transmitter to listen for signals from other room transmitters.

10. A method of locating an item in a facility, the method comprising:
    positioning a number of room transmitters in multiple areas within a facility;
    configuring each room transmitter to generate a unique, modulated signature;
    wherein configuring each room transmitter includes configuring a first room transmitter to send a time varying signal that varies between a first frequency and a second frequency and configuring a second room transmitter to send a time varying signal that varies between a third frequency and a fourth frequency during the same time that the first transmitter sends its time varying signal;
    fitting one or more items with a location tag, at least one of the items operable to acquire physiologic data;
    distributing the tagged items throughout the facility;
    configuring each location tag to have an identity, to regularly transmit its identity and the physiologic data, and to regularly retransmit the signature or a representation of the signature of any room transmitter within a reception range of the respective tag;
    positioning at least one locating receiver within the facility;
    determining the likely location and identity of at least one of the location tags based on transmissions from that location tag received by the locating receiver; and
    wherein determining the likely location includes determining the location of one of the location tags based on the offset of the time varying signal from the first and second room transmitters.

11. A method as claimed in claim 10, further comprising generating an output indicative of the location and identity of the location tag.

12. A method as claimed in claim 10, further comprising synchronizing the room transmitters within an area within the facility so that each room transmitter sends a unique, time dependent signal.

13. A method as claimed in claim 10, further comprising configuring each room transmitter with a secondary receiver.

14. A method as claimed in claim 13, further comprising sending a signal from at least one locating receiver to each room transmitter.

15. A method as claimed in claim 14, further comprising
    sending a synchronization code to each room transmitter that causes each room transmitter to transmit its respective signature signal at a known time; and
    determining the location of a location tag based on the time that the location tag receives the signature signals from the room transmitters.

16. A method as claimed in claim 10, further comprising configuring each room transmitter with a PLC circuit.

17. A method as claimed in claim 10, further comprising positioning a reference tag in a location within the facility.

18. A method as claimed in claim 17, further comprising configuring the reference tag to transmit a reference signal on a periodic basis.

19. A method as claimed in claim 18, further comprising configuring each room transmitter to listen for signals from other room transmitters.

20. A method of locating an item in a facility, the method comprising:
   positioning a number of room transmitters within a facility;
   synchronizing the room transmitters within an area of the facility so that each room transmitter generates a unique, time dependent signal wherein a first room transmitter is configured to send its unique, time dependent signal which varies between a first frequency and a second frequency and wherein a second room transmitter is configured to send its unique, time dependent signal which varies between a third frequency and a fourth frequency during the same time that the first transmitter sends its time dependent signal;
   fitting one or more items with a location tag;
   distributing the tagged items throughout the facility;
   configuring each location tag to have an identity, to transmit its identity, and to retransmit the unique, time dependent signal of any room transmitter within a reception range of the respective location tag;
   positioning at least one location receiver within the facility, the location receiver operable to receive the unique, time dependent signals from the location tag; and
   determining the location and identity of at least one of the location tags based on the offset of the time dependent signals from the first and second room transmitters.

21. A location system for determining the location of a telemetry device in a facility, the location system comprising:
   a plurality of room transmitters capable of being located throughout the facility, each room transmitter having a unique, modulated signature;
   at least one location receiver;
   at least one telemetry device operable to acquire physiologic data, the telemetry device including
      an identification module operable to store an identity of the telemetry device,
      a receiver operable to receive the signatures of the room transmitters,
      a switch operable to link the physiologic data to the receiver and the identification module,
      a processor operable to combine the physiologic data, the identity, and the signature into a signal, and
      a transmitter to regularly send the signal directly to the location receiver wherein the location receiver is operable to determine the identity of the telemetry device and the likely location of the telemetry device within the facility.

22. A system as claimed in claim 21, further comprising a control computer coupled to the at least one location receiver and operable to generate an output indicative of the location of the at least one telemetry device.

23. A system as claimed in claim 21, further comprising at least two telemetry devices.

24. A system as claimed in claim 21, further comprising at least two location receivers.

25. A system as claimed in claim 21, wherein each of the plurality of room transmitters includes a power supply, a control circuit, a tone generator, and a transducer.

26. A system as claimed in claim 25, wherein the at least one telemetry device includes a transducer, an identification module, a power supply, and a control circuit coupled to the transmitter.

27. A system as claimed in claim 21, wherein each of the plurality of room transmitters includes a power supply, a control circuit, a pulse generator, and an infrared device.

28. A system as claimed in claim 27, wherein the at least one telemetry device includes an infrared sensor, an identification module, a power supply, and a control circuit coupled to the transmitter.

29. A system as claimed in claim 21, wherein the location receiver includes a signal receiver, an identity decoder, and a signature analyzer, the identity decoder and signature analyzer each coupled to the signal receiver.

30. A system as claimed in claim 21, wherein one or more of the plurality of room transmitters includes a housing with a grill and electrical connectors configured to fit in an electrical outlet.

31. A system as claimed in claim 21, wherein one or more of the plurality of room transmitters includes a face plate with a grill and is designed to fit within the recess of an electrical outlet.

32. A system as claimed in claim 21, wherein one or more of the plurality of room transmitters includes a housing with a window and electrical connectors configured to fit in an electrical outlet.

33. A system as claimed in claim 21, wherein one or more of the plurality of room transmitters includes a face plate with a window and is designed to fit within the recess of an electrical outlet.

34. A system as claimed in claim 21, wherein each of the plurality of room transmitters includes a PLC circuit.

35. A system as claimed in claim 21, wherein two or more of the plurality of room transmitters include a secondary receiver.

36. A system as claimed in claim 35, wherein each secondary receiver is an RF receiver.

37. A system as claimed in claim 35, wherein each secondary receiver is an ultrasonic receiver.

38. A location system for determining the location of a portable device in a facility, the location system comprising:
   a plurality of room transmitters capable of being located throughout the facility, each room transmitter having a power supply, a control circuit, a transmitter driver, and a transmitter, the control circuit and transmitter driver operable to generate a unique, modulated signature for each room transmitter;
   a portable device operable to acquire physiologic data, the portable device including
      an identification module operable to store an identity of the portable device,
      a receiver operable to receive the signatures of the room transmitters,
      a switch operable to link the physiologic data to the receiver and the identification module,
      a power supply,
      a transmitter operable to send a signal having information related to the signature of a room transmitter within the reception range of the portable device, the physiologic data, and information related to the identity of the portable device, and
      a control circuit coupled to the transmitter; and at least one locating receiver operable to receive the signal of the portable device, the at least one locating receiver having an identity decoder, and a signature analyzer, the at least one locating receiver operable to determine the identity of the portable device and the likely location of the portable device within the facility.

39. A system as claimed in claim 38, wherein one or more of the plurality of room transmitters includes a housing with a grill and electrical connectors configured to fit in an electrical outlet.

40. A system as claimed in claim 38, wherein one or more of the plurality of room transmitters includes a face plate with a grill and is designed to fit within the recess of an electrical outlet.

41. A system as claimed in claim 38, wherein one or more of the plurality of room transmitters includes a housing with a window and electrical connectors configured to fit in an electrical outlet.

42. A system as claimed in claim 38, wherein one or more of the plurality of room transmitters includes a face plate with a window and is designed to fit within the recess of an electrical outlet.

43. A system as claimed in claim 38, wherein each of the plurality of room transmitters includes a PLC circuit.

44. A system as claimed in claim 38, wherein two or more of the plurality of room transmitters includes a secondary receiver.

45. A system as claimed in claim 44, wherein each secondary receiver is an RF receiver.

46. A system as claimed in claim 44, wherein each secondary receiver is an ultrasonic receiver.

47. A method of locating an item in a facility, the method comprising:
    positioning a number of room transmitters in multiple areas within a facility;
    positioning at least one location receiver within the facility;
    configuring each room transmitter to generate a unique, modulated signature;
    fitting one or more items with a location tag, at least one of the items operable to acquire physiologic data from a patient associated with the item, the location tag having an identity;
    linking the physiologic data, the signature, and the identity to a switch;
    combining the physiologic data, the signature, and the identity to generate a signal;
    configuring each location tag to transmit the signal to the location receiver; and
    determining the likely location and identity of the location tag based on the signal from the location tag.

48. A method as claimed in claim 47, further comprising coupling a control computer to the at least one location receiver and generating an output indicative of the location and identity of the location tag.

49. A method as claimed in claim 47, further comprising synchronizing the room transmitters within a room so that each room transmitter sends a unique, time dependent signal.

50. A method as claimed in claim 49, further comprising configuring a first room transmitter to send a time varying signal that varies between a first frequency and a second frequency and configuring a second room transmitter to send a time varying signal that varies between a third frequency and a fourth frequency during the same time that the first transmitter sends its time varying signal.

51. A method as claimed in claim 47, further comprising configuring each room transmitter with a secondary receiver.

52. A method as claimed in claim 51, further comprising sending a signal from at least one locating receiver to each room transmitter.

53. A method as claimed in claim 52, further comprising
    sending a synchronization code to each room transmitter that causes each room transmitter to transmit its respective signature signal at a known time; and
    determining the location of a location tag based on the time that the location tag receives signature signals from the room transmitters.

54. A method as claimed in claim 47, further comprising configuring each room transmitter with a PLC circuit.

55. A method as claimed in claim 47, further comprising positioning a reference tag in a location within the facility.

56. A method as claimed in claim 55, further comprising configuring the reference tag to transmit a reference signal on a periodic basis.

57. A method as claimed in claim 47, further comprising configuring each room transmitter to listen for signals from other room transmitters.

58. A location system for determining the location of a patient in a facility, the location system comprising:
    a plurality of room transmitters capable of being located throughout the facility, each room transmitter having a unique, modulated signature;
    at least one tag operable to be associated with an item, the item operable to acquire patient data, the at least one tag including
        an identification module operable to store an identity of the tag,
        a receiver operable to receive the signatures of the room transmitters,
        a switch operable to link the patient data to the receiver and the identification module, and
        a transmitter to send a signal having information related to the signature of a room transmitter within the reception range of the tag, the patient data, and information related to the identity of the tag; and
    at least one location receiver operable to receive the signal of the at least one tag and to determine the identity of the tag and the likely location of the patient within the facility.

59. A system as claimed in claim 58, wherein the at least one tag is incorporated in a telemetry device.

60. A system as claimed in claim 59, wherein the telemetry device includes
    at least one signal conditioner to condition a telemetry input;
    a filter and mixer coupled to the receiver of the tag; and
    a multi-channel combiner coupled to the transmitter of the tag.

* * * * *